United States Patent
Zhong et al.

(10) Patent No.: US 12,545,626 B2
(45) Date of Patent: Feb. 10, 2026

(54) METHODS FOR PREPARING SILICON CARBIDE MEMBRANE SUPPORTS USING ACTIVATED COKE FLY ASH

(71) Applicants: NANJING TECH UNIVERSITY, Jiangsu (CN); JIANGSU JIULANG HIGH-TECH CO., LTD., Jiangsu (CN)

(72) Inventors: Zhaoxiang Zhong, Nanjing (CN); Wei Wei, Nanjing (CN); Qilian Li, Nanjing (CN); Feng Han, Nanjing (CN); Weihong Xing, Nanjing (CN)

(73) Assignees: NANJING TECH UNIVERSITY, Nanjing (CN); JIANGSU JIULANG HIGH-TECH CO., LTD., Nanjing (CN)

( * ) Notice: Subject to any disclaimer, the term of this patent is extended or adjusted under 35 U.S.C. 154(b) by 0 days.

(21) Appl. No.: 19/223,428

(22) Filed: May 30, 2025

(65) Prior Publication Data

US 2025/0289761 A1   Sep. 18, 2025

Related U.S. Application Data (63) Continuation of application No. PCT/CN2024/077844, filed on Feb. 20, 2024.

(30) Foreign Application Priority Data

Apr. 28, 2023   (CN) .......... 202310478943.4

(51) Int. Cl.
  *C04B 35/565*   (2006.01)
  *C04B 35/626*   (2006.01)
(Continued)

(52) U.S. Cl.
  CPC ........ *C04B 35/565* (2013.01); *C04B 35/6261* (2013.01); *C04B 38/0041* (2013.01);
(Continued)

(58) Field of Classification Search
  CPC ............ C04B 38/068; C04B 2235/3826–3834
  See application file for complete search history.

(56) References Cited

U.S. PATENT DOCUMENTS

| | | | | |
|---|---|---|---|---|
| 4,607,021 A | * | 8/1986 | Corbin | B01J 37/00 44/605 |
| 2008/0284067 A1 | * | 11/2008 | Naruse | C04B 38/0016 264/630 |

(Continued)

FOREIGN PATENT DOCUMENTS

| | | |
|---|---|---|
| CN | 102659446 A | 9/2012 |
| CN | 104108946 A | 10/2014 |

(Continued)

OTHER PUBLICATIONS

Fox, John M. "Fly Ash Classification—Old and New Ideas." 2017 World of Coal Ash (WOCA) Conference in Lexington, KY (2017). (Year: 2017).*

(Continued)

*Primary Examiner* — Erin Snelting
(74) *Attorney, Agent, or Firm* — PORUS IP LLC (57) ABSTRACT

Embodiments of the present disclosure provide a method for preparing silicon carbide membrane supports using activated coke fly ash. Using activated coke fly ash as a pore-forming agent, micro-sized silicon carbide powder as the primary aggregate, nano-zirconia, alumina, and/or magnesia as sintering aids, and polyvinyl alcohol aqueous solution as a binder. The components are uniformly mixed to obtain a premixed material. The premixed material is extruded via mechanical extrusion to form support green (Continued)

bodies, which are then dried at a constant temperature in a drying oven. Finally, the dried green bodies undergo programmed sintering in a muffle furnace to produce the silicon carbide membrane supports.

7 Claims, 6 Drawing Sheets (51) Int. Cl.
*C04B 38/00* (2006.01)
*C04B 38/06* (2006.01)
(52) U.S. Cl.
CPC .... *C04B 38/068* (2013.01); *C04B 2235/3217* (2013.01); *C04B 2235/3244* (2013.01); *C04B 2235/3826* (2013.01); *C04B 2235/5427* (2013.01); *C04B 2235/5454* (2013.01); *C04B 2235/6021* (2013.01); *C04B 2235/606* (2013.01); *C04B 2235/6562* (2013.01); *C04B 2235/6567* (2013.01)

(56) References Cited

U.S. PATENT DOCUMENTS

2017/0283329 A1 10/2017 Xing et al.
2018/0222083 A1* 8/2018 Nagai ............... C04B 35/62635

FOREIGN PATENT DOCUMENTS

| CN | 104211422 | A | | 12/2014 | |
|----|-----------|---|---|---------|---|
| CN | 105884394 | A | | 8/2016 | |
| CN | 107698276 | A | | 2/2018 | |
| CN | 110028334 | A | | 7/2019 | |
| CN | 110698215 | A | | 1/2020 | |
| CN | 112266250 | A | | 1/2021 | |
| CN | 112707716 | A | * | 4/2021 | ......... C04B 33/1352 |
| CN | 113975972 | A | | 1/2022 | |
| CN | 116462529 | A | | 7/2023 | |
| DE | 69824870 | T2 | | 7/2005 | |
| KR | 20060036489 | A | | 4/2006 | |

OTHER PUBLICATIONS

Gonzalez et al. "Fly ashes from coal and petroleum coke combustion: current and innovated potential applications." Waste Management & Research, 27 (2009) 976-987. DOI: 10.1177/0734242X09103190 (Year: 2009).*

Luo et al. "In-situ reaction bonding to obtain porous SiC membrane supports with excellent mechanical and permeable performance." Ceramics International 45 (2019) 9007-9016. (Year: 2019).*

Narciso-Romero et al. "Influence of the carbon material on the synthesis of silicon carbide." Carbon 37 (1999) 1771-1778. (Year: 1999).*

CN-112707716-A (MA) Apr. 27, 2021 (English language translation). [online] [retrieved Oct. 1, 2025]. Retrieved from: Clarivate Analytics. (Year: 2021).*

First Office Action in Chinese Application No. 202310478943.4 mailed on Jan. 24, 2024, 14 pages.

Notification to Grant Patent Right for Invention in Chinese Application No. 202310478943.4 mailed on Jun. 25, 2024, 5 pages.

International Search Report in PCT/CN2024/077844 mailed on Mar. 26, 2024, 7 pages.

Written Opinion in PCT/CN2024/077844 mailed on Mar. 26, 2024, 8 pages.

* cited by examiner

METHODS FOR PREPARING SILICON CARBIDE MEMBRANE SUPPORTS USING ACTIVATED COKE FLY ASH

CROSS-REFERENCE TO RELATED APPLICATIONS

This application is a Continuation of International Application No. PCT/CN2024/077844, filed on Feb. 20, 2024, which claims priority to Chinese Patent Application No. 202310478943.4, filed on Apr. 28, 2023, the entire contents of each of which are hereby incorporated by reference.

TECHNICAL FIELD

The present disclosure relates to the field of preparation of porous ceramic separation membranes, and in particular, to methods for preparing silicon carbide membrane supports using activated coke fly ash.

BACKGROUND

High-temperature silicon carbide membrane is a material that enables the direct filtration and purification of high-temperature flue gas, with widespread applications in the high-temperature gas-solid separation unit across industries including iron and steel metallurgy, petrochemical industry, coal chemical industry, polycrystalline silicon, waste incineration, and so on. High-temperature silicon carbide ceramic membrane technology effectively avoids the waste of water resources and sludge treatment caused by spray cooling, improves the efficiency of energy utilization, ensures long-term stable usage of the downstream heat exchangers and catalysts, which is an advanced and efficient gas-solid separation technology. During preparation, the high-temperature silicon carbide membrane support requires a large number of pore-forming agents to form a high porosity and uniform pore structure. The composition, particle size distribution, and dosage of the pore-forming agent critically determine the gas permeability of the silicon carbide membrane.

The sintering, coal coking, and other processes in iron and steel plants will produce a large amount of high-temperature flue gas. By using activated coke desulfurization and denitrification technology, after the first and second level of activated coke adsorption, $SO_2$ and mercury are removed from the flue gas and nitrogen oxides ($NO_x$) is catalytically reduced, so that the high-temperature flue gas may discharge $SO_2$ and $NO_x$ in compliance with standards. Recoupled fluidized bed processes regenerates adsorption-saturated activated coke in the regeneration tower. The activated coke in the heating section of the regeneration tower desorbs a high concentration of $SO_2$ gas mixture containing the activated coke fly ash generated due to wear in the fluidization process. After desorption, activated coke particles recycle to the primary and secondary adsorption towers for adsorption in a continuous loop. The high concentration of $SO_2$ gas mixture (containing a large count of the activated coke fly ash) desorbed by the activated coke in the regeneration tower in the heating section, if directly enters the downstream process to prepare ammonium sulfate or sulfuric acid, will result in low product purity. The original process using spray coupled plate and frame filtration technology not only has low filtration efficiency but also causes a series of problems, such as waste of water resources, pollution of the working environment, and difficulties in post-processing activated coke sludge. The high-temperature silicon carbide ceramic membrane purification technology developed by Nanjing Tech University replaces plate and frame filtration technology, efficiently retaining and thus directly obtaining the dry activated coke fly ash while improving the purity of the ammonium sulfate or sulfuric acid product produced in the downstream process.

The activated coke fly ash is a porous material that absorbs a high concentration of $SO_2$ and a small amount of $NH_3$ and contains some metal catalysts. The activated coke fly ash, classified as hazardous waste according to national hazardous waste management regulations, has a complicated disposal procedure and high costs. Through energy spectrum analysis, the main elements in the activated coke fly ash are C, N, O, S, Cu, and Zr, which is suitable as a pore-forming agent in the preparation of a silicon carbide membrane support. At the same time, the metal oxides in the activated coke fly ash may serve as sintering aids for the silicon carbide membrane support. After searching, there is no relevant literature and patents on the high-value application of the activated coke fly ash. Researchers at Wuhan University of Science and Technology prepared rice husk ash-based porous ceramics with porosity of 50%-75% and compressive strength of 2.5-12.5 MPa by using rice husk ash as the main raw material and sodium carboxymethyl cellulose and clay as the binding agent and plasticizer [Chen Hui et al. Preparation and Characterization of Rice Husk Ash-Based Porous Ceramics [J]. Materials Herald, 2014, 8 (3): 122-124.]. Researchers at Yancheng Institute of Technology prepared porous mullite ceramics using straw ash (washed to remove impurities) as the silicon source, $\alpha$-$Al_2O_3$ powder as the aluminum source, and rice husk powder as the pore-forming agent [Jiang Jinhai et al. Preparation of Porous Mullite Ceramics from Straw Ash Slag [J]. Refractory Materials, 2019, 5:450-454]. However, the above rice husk ash and straw ash-based methods have cumbersome process, pollute the environment, and have uneven particle size distribution, thus limiting their application as porous ceramic filtration materials. The activated coke fly ash, as a hazardous waste reuse, has a uniform particle size distribution and may aid in sintering, making it an ideal raw material for the preparation of the silicon carbide membrane support.

The present disclosure provides a method for preparing silicon carbide membrane support. By using the activated coke fly ash that is filtered and intercepted during the activated coke desulfurization and denitrification regeneration purification process at coke plants as a pore-forming agent, the disposal problem of the activated coke fly ash (which contains trace heavy metal ions and adsorbs high concentrations of $SO_2$ and $NH_3$) is resolved. The method effectively reduces the cost of preparing silicon carbide ceramic membrane supports. At the same time, the prepared silicon carbide ceramic membrane has high mechanical strength and gas permeability, demonstrating a broad application prospect.

SUMMARY

One or more embodiments of the present disclosure provide a method for preparing silicon carbide membrane supports using activated coke fly ash. The operations of preparation may be as follows. In S1, silicon carbide aggregate, the activated coke fly ash, and sintering aids may be mixed according to a predetermined ratio to obtain a homogeneous mixed powder a. The activated coke fly ash may be a porous material absorbing high-concentration sulfur dioxide ($SO_2$), trace ammonia ($NH_3$), and contains metal catalysts, with primary elemental composition of carbon (C), nitrogen (N), oxygen (O), sulfur(S), copper (Cu), and zirconium (Zr). In S2, a polyvinyl alcohol aqueous solution may be added to the mixed powder a to obtain a mixture, and the mixture may be homogenized to form a premixed material b. In S3, a silicon carbide support green body may be formed from the premixed material b by mechanical extrusion, followed by isothermal drying, a dried support green body c may be obtained. In S4, the dried support green body c may be sintered in a muffle furnace under a programmed temperature profile to obtain the silicon carbide membrane support d.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

To more clearly illustrate the technical solutions related to the embodiments of the present disclosure, a brief introduction of the drawings referring to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Figure 1:
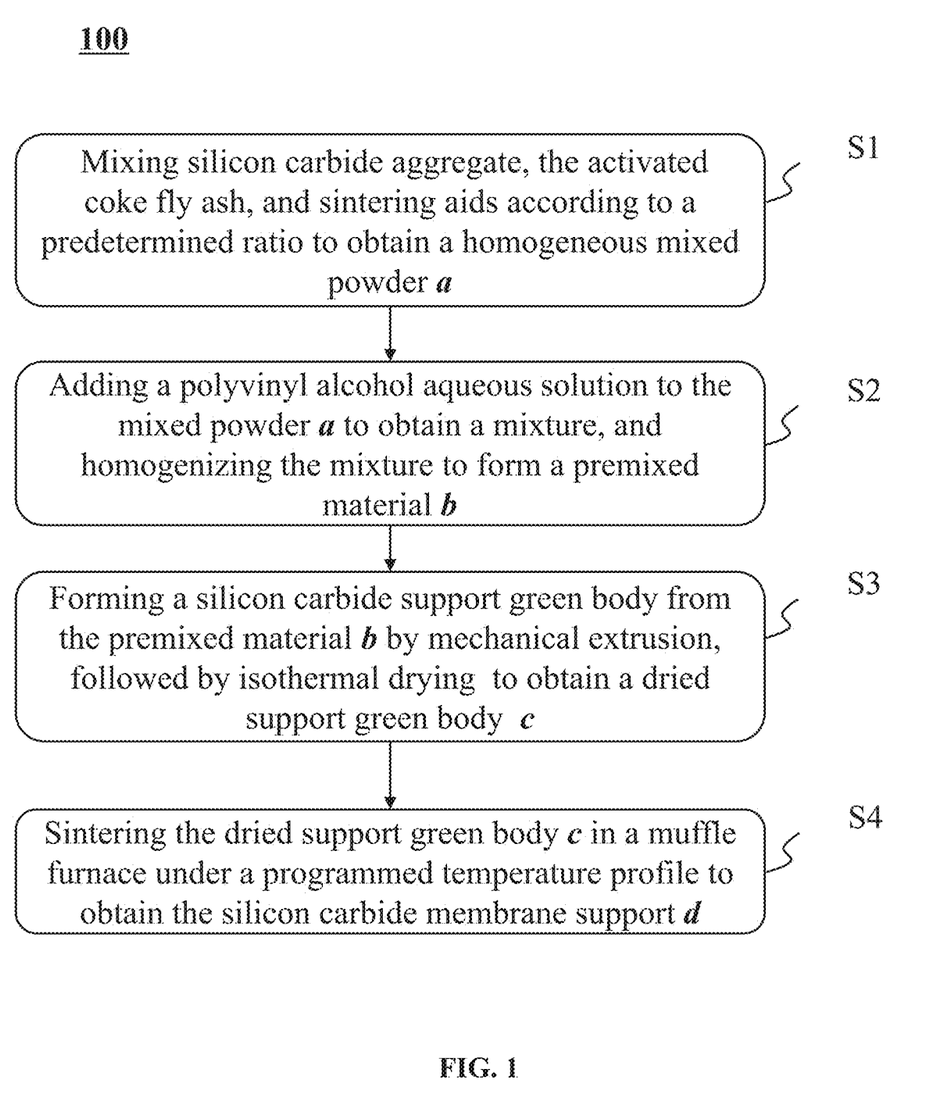
FIG. 1 is a flowchart illustrating an exemplary method for preparing silicon carbide membrane supports using activated coke fly ash according to some embodiments in the present disclosure.

FIG. 1 is a flowchart illustrating an exemplary method for preparing silicon carbide membrane supports using activated coke fly ash according to some embodiments in the present disclosure.

A method for preparing silicon carbide membrane supports using activated coke fly ash, uses activated coke fly ash as a pore-forming agent, silicon carbide powder as an aggregate, sintering aids such as nano-zirconia, alumina, magnesia, etc., and polyvinyl alcohol as a binder. Preparation operations include mixing, extrusion molding, drying, and sintering.

As shown in FIG. 1, process 100 includes the following operations.

In S1, silicon carbide aggregate, the activated coke fly ash, and sintering aids are mixed according to a predetermined ratio to obtain a homogeneous mixed powder a.

Silicon carbide (SiC) exhibits properties such as high hardness, high temperature resistance, corrosion resistance, high thermal conductivity, etc. Therefore, the silicon carbide aggregate may be used as the main structural backbone of the silicon carbide membrane supports for providing mechanical strength and high temperature stability.

In some embodiments, the sintering aids include one or more of nano-zirconia, alumina, and magnesia. The sintering aids may reduce the sintering temperature, inhibit excessive grain growth, refine microstructures, and improve mechanical properties of the silicon carbide membrane supports.

In some embodiments, an average particle size of the silicon carbide aggregate in the mixed powder is within a range of 1-300 μm, and an average particle size of the sintering aid is within a range of 50-500 nm.

Different particle sizes of the silicon carbide aggregate affect porosities and strengths of the silicon carbide membrane supports. For example, a coarse-grained silicon carbide aggregate (e.g., a silicon carbide aggregate with a particle size within a range of 200-300 μm) may form a macro-porous structure and improve gas permeability, while a fine-grained silicon carbide aggregate (e.g., a silicon carbide aggregate with a particle size within a range of 1-50 μm) may enhance a sintering densification and improve a flexural strength.

In some embodiments of the present disclosure, by limiting the particle size of the silicon carbide aggregate (within a range of 1-300 μm), the mechanical strength of the support may be enhanced by the skeleton effect of the micrometer-sized particles while ensuring the high porosity of the support. In addition, the nano-zirconia (with a particle size within a range of 50-500 mm), the alumina, or the magnesia may be used as the sintering aid to enhance the inter-particle bonding through a high specific surface area, which may further strengthen the structure of the material, realizing the balance of porosity and flexural strength while reducing energy consumption and shortening the sintering cycle.

In some embodiments, the activated coke fly ash is a porous material absorbing high-concentration sulfur dioxide ($SO_2$), trace ammonia ($NH_3$), and contains metal catalysts, with primary elemental composition of carbon (C), nitrogen (N), oxygen (O), sulfur(S), copper (Cu), and zirconium (Zr).

The metal catalysts may be an oxide of Cu, an oxide of Zr, etc., such as CuO, $ZrO_2$, etc. The concentration of $SO_2$ adsorbed in the activated coke fly ash may be within a range of 50-300 mg/g (i.e., each gram of the activated coke fly ash absorbs 50-300 mg of $SO_2$), an adsorbed amount of $NH_3$ in the activated coke fly ash may be within a range of 1-20 mg/g (i.e., each gram of the activated coke fly ash absorbs 1-20 mg of $NH_3$), and a loading (i.e., mass fraction) of the metal catalysts in the activated coke fly ash may be within a range of 0.5%-5%. The above data is for example only and is not intended to be limiting.

The activated coke fly ash decomposes or oxidizes during high-temperature sintering, leaving pores, so it may be used as the pore-forming agent. At the same time, the metal catalysts in the activated coke fly ash may lower the sintering temperature and promote the bonding of SiC particles, so that the activated coke fly ash may also be used as the sintering aids of the silicon carbide membrane supports.

In some embodiments, the activated coke fly ash is subjected to ball milling for 2-6 hours with a rotational speed within a range of 200-500 revolutions per minute (r/min) and a ball-to-powder ratio within a range of 2-10 to achieve a uniform particle size.

The ball-to-powder ratio refers to a ratio of a mass of a grinding media (balls) to a mass of a material to be treated in a ball milling process, usually expressed as a mass ratio. The ball-to-powder ratio within a range of 2-10 means that if a mass of the activated coke fly ash is 1 kg, a mass of grinding balls is within a range of 2-10 kg.

In some embodiments of the present disclosure, by ball milling for 2-6 h at the ball-to-powder ratio within a range of 2-10 and the rotational speed within a range of 200-500 r/min, uniform particle size of the activated coke fly ash may be ensured, and localized pore-making unevenness may be avoided.

In some embodiments, the proportions (i.e., mass ratios) of the silicon carbide aggregate, the activated coke fly ash, and the sintering aids required to prepare the mixed powder a may be set manually based on actual needs in conjunction with historical experience.

In some embodiments, a proportion of ball-milled activated coke fly ash in the mixed powder a is within a range of 5-20 weight percent (wt. %), and 1-10 wt. % of the sintering aids are selected from one or more of zirconia, alumina, and magnesia, with remainder being the silicon carbide aggregate (i.e., a proportion of the silicon carbide aggregate is within a range of 70-94 wt. %).

In some embodiments of the present disclosure, by controlling the composition and ratio of the mixed powder, the porosity and the pore size distribution may be effectively controlled to improve the permeability and selectivity of the silicon carbide membrane and improve the separation efficiency.

In S2, a polyvinyl alcohol aqueous solution is added to the mixed powder a to obtain a mixture, and the mixture is homogenized to form a premixed material b.

In some embodiments, an amount (both a mass and a concentration) of the polyvinyl alcohol aqueous solution added to the mixed powder a may be set manually based on actual needs in conjunction with historical experience.

In some embodiments, the concentration of the polyvinyl alcohol aqueous solution is within a range of 2.5-10 wt. %, and the polyvinyl alcohol aqueous solution is added in an amount within a range of 1-5% of a mass of the mixed powder a.

In some embodiments of the present disclosure, the polyvinyl alcohol solution with the concentration of 2.5-10 wt. % has good viscosity and fluidity, and its addition to the mixed powder a may effectively improve the uniform dispersion of the mixed powder, thereby ensuring the membrane support's molding quality. Adding the polyvinyl alcohol aqueous solution in the amount within the range of 1-5% of the mass of the mixed powder a may avoid a low strength of the raw blank and drying and cracking caused by excessive amount.

In S3, a silicon carbide support green body is formed from the premixed material b by mechanical extrusion, followed by isothermal drying to obtain a dried support green body c.

The mechanical extrusion refers to a manner of forcibly extruding raw materials into specific shapes at preset temperatures and pressures by mechanical devices.

In some embodiments, an amount of the premixed material b and the time of the isothermal drying may be set manually, based on actual needs in conjunction with historical experience.

In some embodiments, a drying temperature of the silicon carbide membrane supports is within a range of 50-100° C., and a drying time of the silicon carbide membrane supports is within a range of 1-4 hours.

In some embodiments of the present disclosure, drying the silicon carbide support green body prepared by the mechanical extrusion is dried at a temperature of 50-100° C. for 1-4 h may avoid rapid evaporation leading to deformation of the green body as well as ensure that the moisture is removed slowly, which is conducive to enhancing the uniformity and a mechanical strength of the green body and effectively reducing the risk of cracking and deformation.

In S4, the dried support green body c is sintered in a muffle furnace under a programmed temperature profile to obtain the silicon carbide membrane support d.

In some embodiments, the programmed temperature profile during sintering the dried support green body c is as follows. From 0 to 500° C., the dried support green body c is heated at a rate of 1-2° C./min with a holding time of 2-4 hours at 500° C. From 500 to 1000° C., the dried support green body c is heated at a rate of 2-4° C./min, and above 1000° C., further heating the dried support green body c at a rate of 0.5-1° C./min to a final sintering temperature of 1250-1450° C., with a holding time at the final sintering temperature for 4-6 hours, followed by natural cooling.

In some embodiments of the present disclosure, the design of heating at a rate of 1-2° C./min at 0-500° C. and holding at 500° C. for 2-4 h may slowly remove residual organic matter and prevent cracking of the support body. The design of heating at a rate of 2-4° C./min at 500-1000° C. may avoid a concentration of thermal stresses. The design of heating at a rate of 0.5-1° C./min above 1000° C. to a final sintering temperature of 1250-1450° C., with a holding time at the final sintering temperature for 4-6 h may promote a diffusion and bond of silicon carbide particles to form sintering necks.

In some embodiments of the present disclosure, by using hazardous waste—the activated coke fly ash as the pore-forming agent for the silicon carbide membrane supports, and utilizing the metal oxide to aid in sintering, the prepared silicon carbide membrane supports exhibit low cost, high porosity, high mechanical strength, and excellent gas permeability, which is suitable for high-temperature flue gas purification in steel coking, petrochemical, coal chemical, biomass gasification, and waste incineration. In addition, the method requires only operations of mixing, extrusion molding, drying, and sintering, which is simple to handle, easy to operate, and convenient for industrialized production.

The present disclosure is explained further below in connection with embodiments. The following embodiments are only used to illustrate the present disclosure but are not used to limit the scope of embodiments of the present disclosure.

Embodiment 1

First, the activated coke fly ash was pretreated as follows. The activated coke fly ash was subjected to ball milling for 6 h, with a rotational speed of 500 r/min and a ball-to-powder ratio of 2. Then, silicon carbide (the silicon carbide aggregate) with an average particle size of 1 μm, zirconium oxide and alumina (the sintering aids) with an average particle size of 50 nm, and the activated coke fly ash after the above pretreatment were mixed and stirred homogeneously in accordance with the mass ratio of 94:0.5:0.5:5 to obtain the mixed powder a. The polyvinyl alcohol aqueous solution with a concentration of 2.5 wt. % was added to the mixed powder a, with an addition amount of 1 wt. %, to obtain a mixture, and the mixture was stirred homogenously to obtain the premixed material b. The silicon carbide support green body prepared by the mechanical extrusion was dried at a constant temperature of 50° C. for 4 h to obtain the dried silicon carbide support green body c. The dried silicon carbide support green body c was sintered under a programmed temperature profile. From 0 to 500° C., the heating rate was 1° C./min, the dried silicon carbide support green body c was insulated at 500° C. for 2 h, from 500 to 1000° C., the heating rate was 2° C./min, and above 1000° C., the heating rate was 0.5° C./min, with the final sintering temperature of 1250° C., and the dried silicon carbide support green body c was insulated at the final sintering temperature for 4 h, followed by natural cooling.

The average pore diameter of the silicon carbide membrane support was tested to be 450 nm, the porosity was 42.5%, the gas permeation flux was 32 $m^3 \cdot m^{-2} \cdot h^{-1} \cdot kPa^{-1}$, and the flexural strength was 60 MPa.

Embodiment 2

First, the activated coke fly ash was pretreated as follows. The activated coke fly ash was subjected to ball milling for 5 h, with a rotational speed of 500 r/min and a ball-to-powder ratio of 4. Then, silicon carbide (the silicon carbide aggregate) with an average particle size of 50 μm, zirconium oxide and alumina (the sintering aids) with an average particle size of 100 nm, and the activated coke fly ash after the above pretreatment were mixed and stirred homogenously in accordance with the mass ratio of 90:1:1:8 to obtain the mixed powder a. The polyvinyl alcohol aqueous solution with a concentration of 3 wt. % was added to the mixed powder a, with an addition amount of 2 wt. %, to obtain a mixture, and the mixture was stirred homogeneously to obtain the premixed material b. The silicon carbide support green body prepared by the mechanical extrusion was dried at a constant temperature of 50° C. for 4 h to obtain the dried silicon carbide support green body c. The dried silicon carbide support green body c was sintered under a programmed temperature profile. From 0 to 500° C., the heating rate was 1° C./min, the dried silicon carbide support green body c was insulated at 500° C. for 2.5 h, from 500 to 1000° C., the heating rate was 2.5° C./min, and above 1000° C., the heating rate was 0.5° C./min, with the final sintering temperature of 1300° C., and the dried silicon carbide support green body c was insulated at the final sintering temperature for 4 h, followed by natural cooling.

Figure 2:
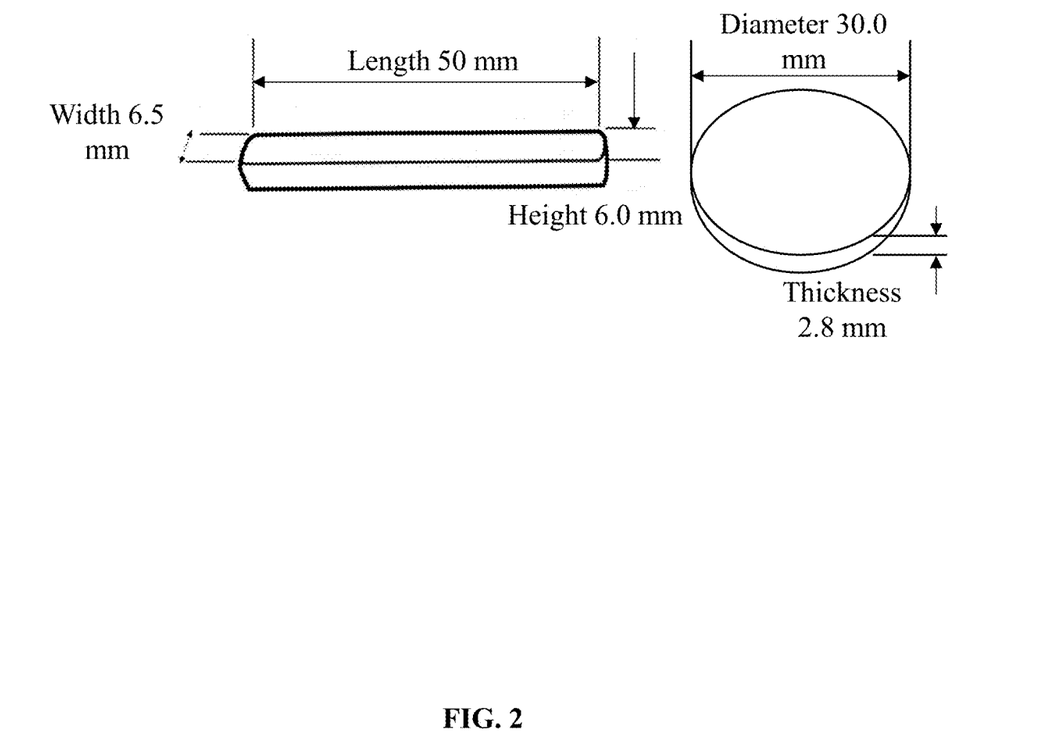
FIG. 2 is a physical diagram of sheet and strip silicon carbide membrane supports according to some embodiments of the present disclosure.

The average pore diameter of the silicon carbide membrane support was tested to be 15 μm, the porosity was 43.2%, the gas permeation flux was 250 $m^3 \cdot m^{-2} \cdot h^{-1} \cdot kPa^{-1}$, and the flexural strength was 46.5 MPa. The silicon carbide membrane support obtained in embodiment 2 is shown in FIG. 2. FIG. 2 is a physical diagram of sheet and strip silicon carbide membrane supports according to some embodiments of the present disclosure.

Embodiment 3

First, the activated coke fly ash was pretreated as follows. The activated coke fly ash was subjected to ball milling for 4 h, with a rotational speed of 400 r/min and a ball-to-powder ratio of 5. Then, silicon carbide with an average particle size of 100 μm, zirconium oxide and alumina with an average particle size of 200 nm, and the activated coke fly ash after the above pretreatment were mixed and stirred homogeneously in accordance with the mass ratio of 86:2:2:10 to obtain the mixed powder a. The polyvinyl alcohol aqueous solution with a concentration of 4 wt. % was added to the mixed powder a, with an addition amount of 2.5 wt. %, to obtain a mixture, and the mixture was stirred homogeneously to obtain the premixed material b. The silicon carbide support green body prepared by the mechanical extrusion was dried at a constant temperature of 80° C. for 3 h to obtain the dried silicon carbide support green body c. The dried silicon carbide support green body c was sintered under a programmed temperature profile. From 0 to 500° C., the heating rate was 2° C./min, the dried silicon carbide support green body c was insulated at 500° C. for 3 h, from 500 to 1000° C., the heating rate was 3° C./min, and above 1000° C., the heating rate was 0.5° C./min, with the final sintering temperature of 1350° C., and the dried silicon carbide support green body c was insulated at the final sintering temperature for 5 h, followed by natural cooling.

The average pore diameter of the silicon carbide membrane support was tested to be 15 μm, the porosity was 43.2%, the gas permeation flux was 700 $m^3 \cdot m^{-2} \cdot h^{-1} \cdot kPa^{-1}$, and the flexural strength was 35.5 MPa.

Figure 3:
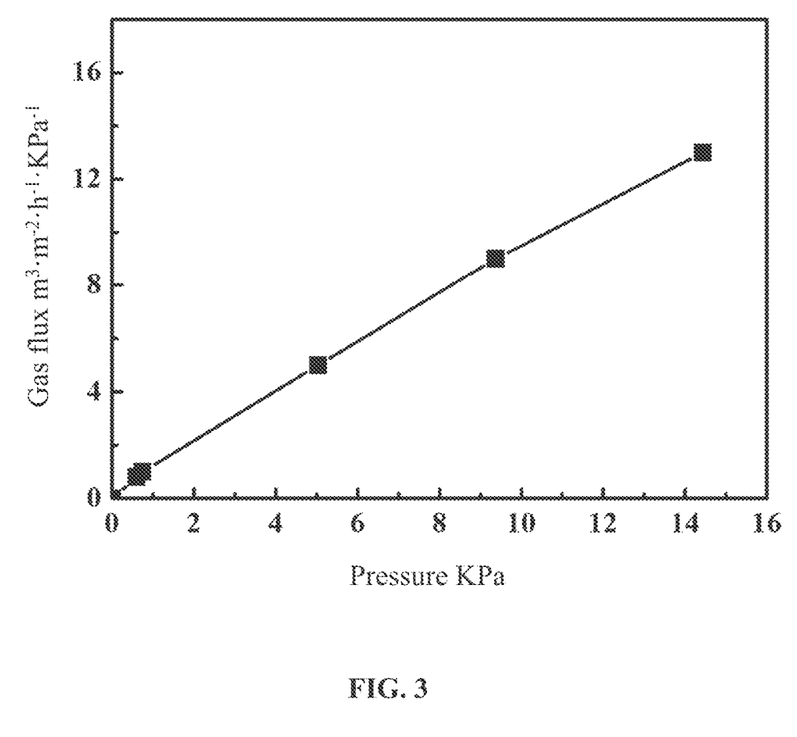
FIG. 3 is a gas flux diagram of a sheet silicon carbide ceramic membrane support according to some embodiments in the present disclosure.
Figure 4:
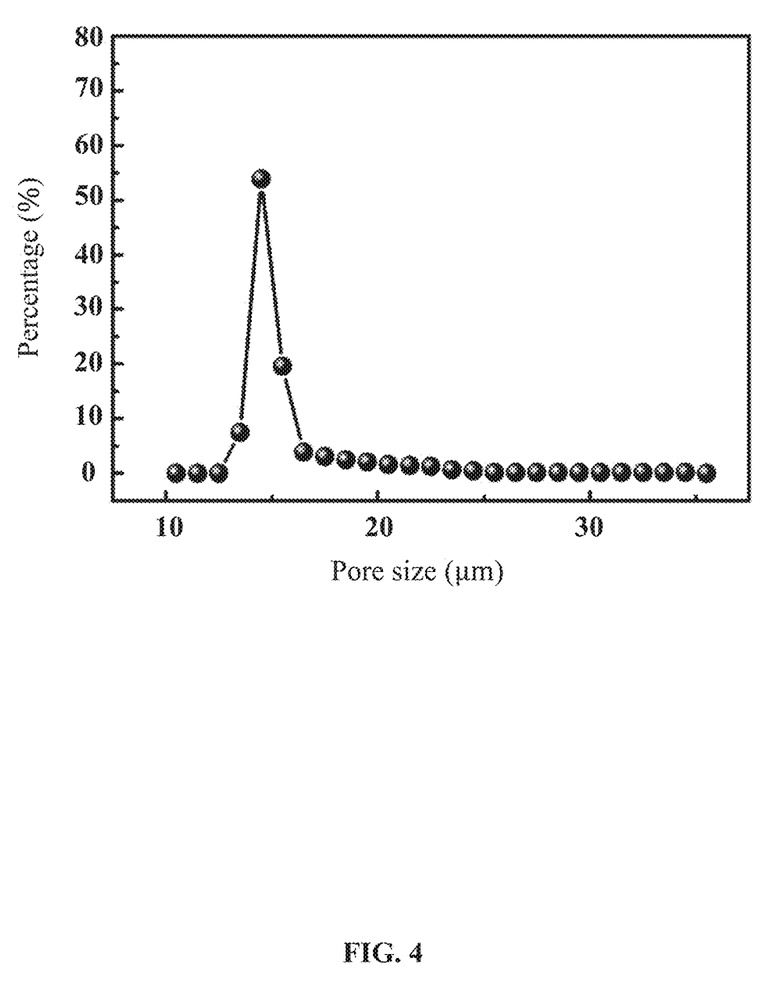
FIG. 4 is a graph of a pore size distribution of a sheet silicon carbide ceramic membrane support according to some embodiments of the present disclosure.

The gas flux diagram and the graph of the pore size distribution of the silicon carbide membrane support obtained in embodiment 3 are shown in FIG. 3 and FIG. 4, respectively.

FIG. 3 is a gas flux diagram of a sheet silicon carbide ceramic membrane support according to some embodiments in the present disclosure. Horizontal coordinates in FIG. 3 show the pressure, and vertical coordinates show the gas flux. The pressure (i.e., a trans-membrane pressure difference) is a difference in pressure between an upstream and a downstream of the membrane as gas passes through the silicon carbide membrane support, measured in kilopascals (kPa). The gas flux indicates the volume of gas passing through a unit membrane area per unit time in $m^3 \cdot m^{-2} \cdot h^{-1} \cdot kPa^{-1}$ (i.e., the count of cubic meters of gas passing through per square meter of membrane area, per hour, and per kilopascal of differential pressure). The trans-membrane pressure difference is a driving force of gas permeation, and its size directly affects the gas flux. The larger the trans-membrane pressure difference, the stronger the force pushing the gas through the membrane holes, resulting in a larger gas flux.

FIG. 4 is a graph of a pore size distribution of a sheet silicon carbide ceramic membrane support according to some embodiments of the present disclosure. Horizontal coordinates in FIG. 4 show the pore sizes, and vertical coordinates show percentages. The pore size is a diameter of the pore in the silicon carbide membrane support with a unit of μm. The percentage (%) labeled in the vertical coordinate indicates a proportion of the volume (or number) of pores of a given pore size (or pore size interval) of total pores. The graph of the pore size distribution is used to analyze the uniformity of pore distribution. The higher the peak, the larger the percentage of pores in that pore size. For example, the peak at 15 μm in FIG. 4 is significant, indicating that the prepared sheet silicon carbide ceramic membrane support is dominated by pores of that size.

Embodiment 4

First, the activated coke fly ash was pretreated as follows. The activated coke fly ash was subjected to ball milling for 3 h, with a rotational speed of 400 r/min and a ball-to-powder ratio of 8. Then, silicon carbide with an average particle size of 200 μm, zirconium oxide and alumina with an average particle size of 1 μm, and the activated coke fly ash after the above pretreatment were mixed and stirred homogeneously in accordance with the mass ratio of 84:2:2:12 to obtain the mixed powder a. The polyvinyl alcohol aqueous solution with a concentration of 6 wt. % was added to the mixed powder a, with an addition amount of 3.0 wt. %, to obtain a mixture, and the mixture was stirred homogeneously to obtain the premixed material b. The silicon carbide support green body prepared by the mechanical extrusion was dried at a constant temperature of 80° C. for 3 h to obtain the dried silicon carbide support green body c. The dried silicon carbide support green body e was sintered under a programmed temperature profile. From 0 to 500° C., the heating rate was 2° C./min, the dried silicon carbide support green body c was insulated at 500° C. for 4 h, from 500 to 1000° C., the heating rate was 4° C./min, and above 1000° C., the heating rate was 1° C./min, with the final sintering temperature of 1400° C., and the dried silicon carbide support green body c was insulated at the final sintering temperature for 5 h, followed by natural cooling.

The average pore diameter of the silicon carbide membrane support was tested to be 32 μm, the porosity was 44.5%, the gas permeation flux was 1080 $m^3 \cdot m^{-2} \cdot h^{-1} \cdot kPa^{-1}$, and the flexural strength was 28.8 MPa.

Figure 5:
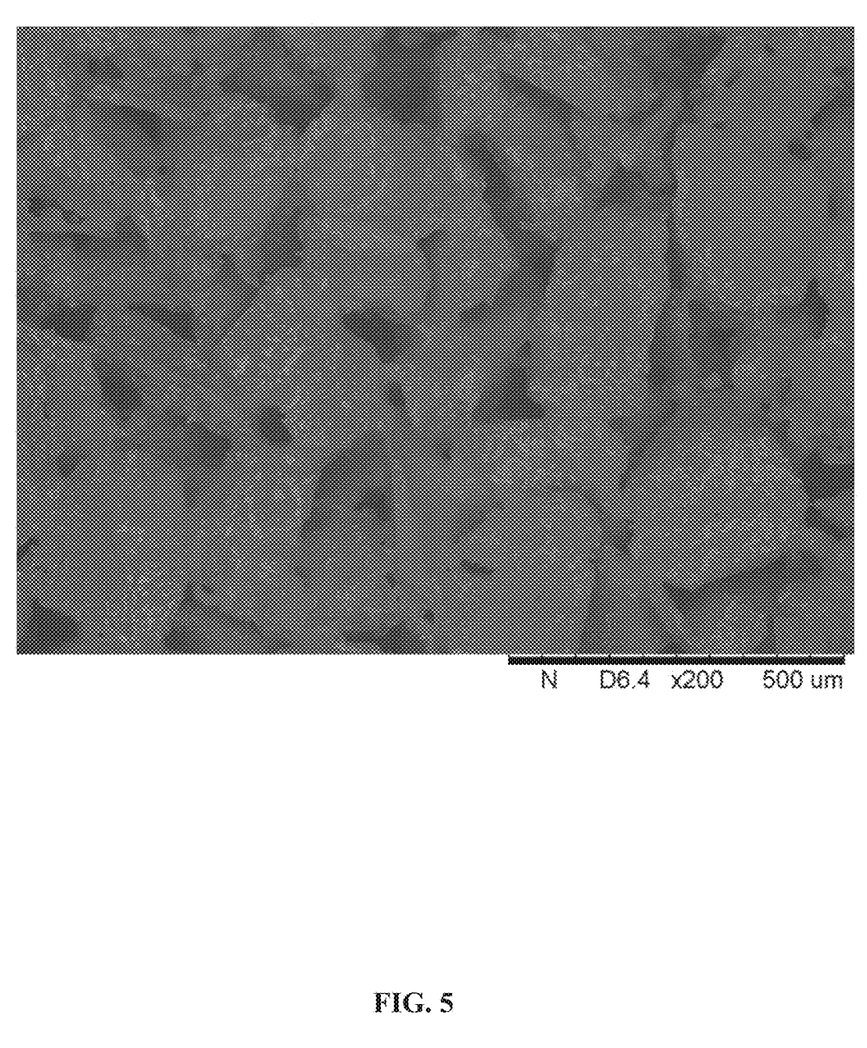
FIG. 5 is a microscopic topography of a strip silicon carbide ceramic membrane support according to some embodiments of the present disclosure.

The microscopic topography of the silicon carbide membrane support obtained in embodiment 4 is shown in FIG. 5. A graph of a particle size distribution analysis of activated coke fly ash after ball milling for 3 hours in embodiment 4 is shown in FIG. 6.

FIG. 5 is a microscopic topography of a strip silicon carbide ceramic membrane support according to some embodiments of the present disclosure. The microscopic topography, i.e., scanning electron microscope (SEM) photograph, is used to demonstrate the microstructure, verify the sintering result, and highlight the porosity of the activated coke.

Figure 6:
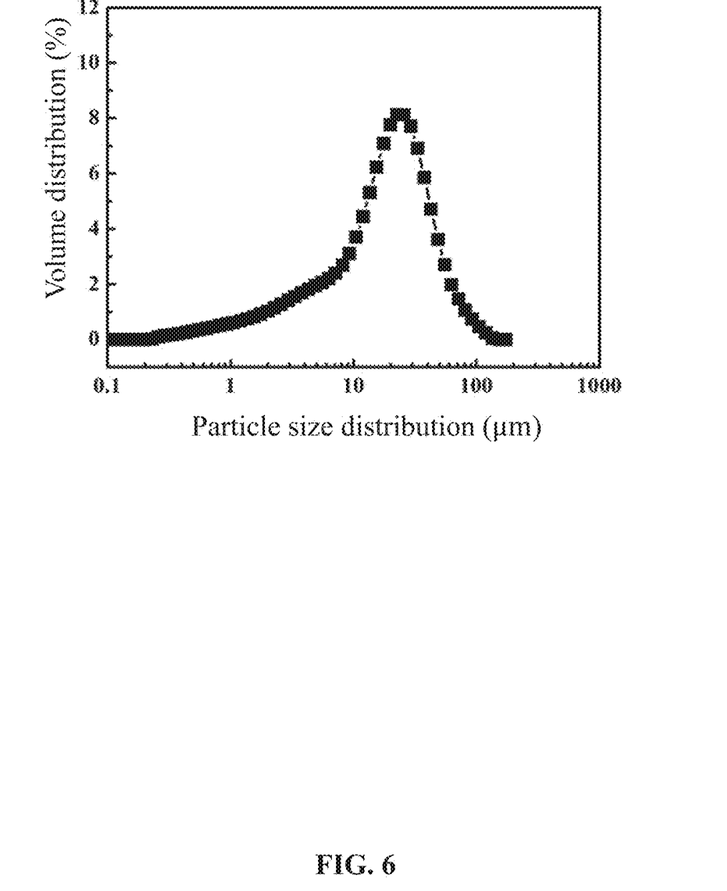
FIG. 6 is a graph of a particle size distribution analysis of activated coke fly ash after ball milling for 3 hours according to some embodiments of the present disclosure.

FIG. 6 is a graph of a particle size distribution analysis of activated coke fly ash after ball milling for 3 hours according to some embodiments of the present disclosure. Horizontal coordinates in FIG. 6 show the particle size distribution, and vertical coordinates show the volume distribution. The particle size indicates the diameter of the ball-milled activated coke fly ash particles, with a unit of μm. The volume distribution indicates the volume proportion of the activated coke fly ash particles of a given size (or size interval) in a total count of particles. The graph of the particle size distribution analysis may be used to assess the homogeneity of the sizes of the activated coke fly ash particles. For example, the peak in FIG. 6 appears in the interval of 10 μm-100 μm, indicating that most of the fly ash particles are close to the size of this interval after the ball milling of the activated coke fly ash for 3 hours, which is favorable for the formation of uniform pores.

Embodiment 5

First, the activated coke fly ash was pretreated as follows. The activated coke fly ash was subjected to ball milling for 2 h, with a rotational speed of 200 r/min and a ball-to-powder ratio of 10. Then, silicon carbide with an average particle size of 300 μm, zirconium oxide and alumina with an average particle size of 500 nm, and the activated coke fly ash after the above pretreatment were mixed and stirred homogeneously in accordance with the mass ratio of 70:5:5:20 to obtain the mixed powder a. The polyvinyl alcohol aqueous solution with a concentration of 10 wt. % was added to the mixed powder a, with an addition amount of 5.0 wt. %, to obtain a mixture, and the mixture was stirred homogeneously to obtain the premixed material b. The silicon carbide support green body prepared by the mechanical extrusion was dried at a constant temperature of 100° C. for 1 h to obtain the dried silicon carbide support green body c. The dried silicon carbide support green body c was sintered under a programmed temperature profile. From 0 to 500° C., the heating rate was 1° C./min, the dried silicon carbide support green body c was insulated at 500° C. for 3 h, from 500 to 1000° C., the heating rate was 3° C./min, and above 1000° C., the heating rate was 0.5° C./min, with the final sintering temperature of 1450° C., and the dried silicon carbide support green body c was insulated at the final sintering temperature for 6 h, followed by natural cooling.

The average pore diameter of the silicon carbide membrane support was tested to be 48.8 μm, the porosity was 44.2%, the gas permeation flux was 1540 $m^3 \cdot m^{-2} \cdot h^{-1} \cdot kPa^{-1}$, and the flexural strength was 25.5 MPa.

Comparative Example 1

Comparative example 1 differs from embodiment 3 in that the activated carbon with an average particle size of 25 μm is used in place of the activated coke fly ash, while the remaining operations are the same as in embodiment 3.

As may be observed from the SEM photographs of the comparative example 1 and embodiment 3, when the activated carbon with an average particle size of 25 μm replaces the activated coke fly ash, the silicon carbide membrane support has an average pore diameter of 17.2 μm, a porosity of 42.2%, a gas permeation flux of 600 $m^3 \cdot m^{-2} \cdot h^{-1} \cdot kPa^{-1}$, and a flexural strength of 30.4 MPa. The gas flux and flexural strength of the silicon carbide membrane support showed a significant decrease, mainly because the activated coke fly ash contains metal oxides that facilitate better sintering, while activated carbon does not exhibit this property.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be sug- gested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment", "one embodiment", or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about", "approximate", or "substantially". For example, "about", "approximate", or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for preparing silicon carbide membrane supports using activated coke fly ash, comprising:
   S1, mixing silicon carbide aggregate, the activated coke fly ash, and sintering aids according to a predetermined ratio to obtain a homogeneous mixed powder a, wherein the activated coke fly ash is a porous material that absorbs sulfur dioxide (SO2) and ammonia (NH3), the activated coke fly ash contains metal catalysts and the activated coke fly ash has an elemental composition of carbon (C), nitrogen (N), oxygen (O), sulfur(S), copper (Cu), and zirconium (Zr);
   S2, adding a polyvinyl alcohol aqueous solution to the mixed powder a to obtain a mixture, and homogenizing the mixture to form a premixed material b;
   S3, forming a silicon carbide support green body from the premixed material b by mechanical extrusion, followed by isothermal drying to obtain a dried support green body c; and
   S4, sintering the dried support green body c in a muffle furnace under a programmed temperature profile to obtain a silicon carbide membrane support d.

2. The method of claim 1, wherein
   in S1, the activated coke fly ash is subjected to ball milling for 2-6 hours with a rotational speed within a range of 200-500 revolutions per minute (r/min) and a ball-to-powder ratio within a range of 2-10 to achieve a uniform particle size.

3. The method of claim 1, wherein
   in S1, the silicon carbide aggregate in the mixed powder a has an average particle size within a range of 1-300 micrometers (μm), and the sintering aids include one or more of nano-zirconia, alumina, and magnesia with an average particle size within a range of 50-500 nanometers (nm).

4. The method of claim 1, wherein in S1,
   a proportion of ball-milled activated coke fly ash in the mixed powder a is within a range of 5-20 weight percent (wt. %),
   a proportion of the sintering aids in the mixed powder a is within a range of 1-10 wt. %, the sintering aids are selected from one or more of zirconia, alumina, and magnesia, and
   remainder is the silicon carbide aggregate.

5. The method of claim 1, wherein
   in S2, a concentration of the polyvinyl alcohol aqueous solution is within a range of 2.5-10 wt. %, and the polyvinyl alcohol aqueous solution is added in an amount within a range of 1-5% of a mass of the mixed powder a.

6. The method of claim 1, wherein
in S3, a drying temperature of the silicon carbide support green body is within a range of 50-100° C., and a drying time of the silicon carbide support green body is within a range of 1-4 hours.

7. The method of claim 1, wherein
in S4, the programmed temperature profile includes: from 0 to 500° C., heating the dried support green body c at a rate of 1-2° C./min with a holding time of 2-4 hours at 500° C., from 500 to 1000° C., heating the dried support green body c at a rate of 2-4° C./min, and above 1000° C., further heating the dried support green body c at a rate of 0.5-1° C./min to a final sintering temperature of 1250-1450° C., with a holding time at the final sintering temperature for 4-6 hours, followed by natural cooling.

\* \* \* \* \*